United States Patent
Zöllig

(10) Patent No.: US 7,753,302 B2
(45) Date of Patent: Jul. 13, 2010

(54) ROTOR FOR AN IMPACT CRUSHER

(75) Inventor: Mario Zöllig, Bottighofen (CH)

(73) Assignee: swissRTec GmbH, Mammern (CH)

( * ) Notice: Subject to any disclaimer, the term of this patent is extended or adjusted under 35 U.S.C. 154(b) by 0 days.

(21) Appl. No.: 12/086,071

(22) PCT Filed: Nov. 30, 2006

(86) PCT No.: PCT/CH2006/000674

§ 371 (c)(1),
(2), (4) Date: Sep. 5, 2008

(87) PCT Pub. No.: WO2007/065282

PCT Pub. Date: Jun. 14, 2007

(65) Prior Publication Data

US 2009/0159732 A1    Jun. 25, 2009

(30) Foreign Application Priority Data

Dec. 8, 2005    (CH) .................................... 1937/05

(51) Int. Cl.
*B02C 13/28* (2006.01)
(52) U.S. Cl. ...................... 241/195; 241/294
(58) Field of Classification Search .............. 241/189.1, 241/194, 195, 197, 294
See application file for complete search history.

(56) References Cited

U.S. PATENT DOCUMENTS 1,686,128 A    10/1928    Duncan
2,152,332 A    3/1939    Smith
6,129,300 A    10/2000    Heukamp et al.

FOREIGN PATENT DOCUMENTS

| DE | 1 184 609 | 12/1964 |
| DE | 103 55 119 A1 | 6/2005 |
| EP | 0 945 181 A1 | 9/1999 |
| GB | 557461 | 11/1943 |
| WO | WO 00/53324 | 9/2000 |

OTHER PUBLICATIONS

Co-Pending U.S. Appl. No. 12/086,072, filed Sep. 5, 2008; inventor Mario Zöllig; title Stator for an Impact Crusher.

*Primary Examiner*—Mark Rosenbaum
(74) *Attorney, Agent, or Firm*—Pauley Petersen & Erickson

(57) ABSTRACT

A rotor of an impact crusher has at least one stellate plate, which can be attached to the rotor shaft. A plurality of paddle-blade type hammer tools are mounted on each stellate plate. The hammer tools are secured above and below the stellate plate by tool mounting brackets having hook-shaped ends that engage with the hammer tools. A respective adapter piece is placed in the stellate plate between the two tool mounting brackets. A retaining bolt penetrates the two tool mounting brackets and the adapter piece. A security slide secures the retaining bolt in position. The hammer tools of the inventive rotor for an impact crusher have a high usage volume and the rotor is extremely user-friendly with respect to the recurring tasks of setting and replacing the hammer tools, without having to loosen screw connections.

20 Claims, 4 Drawing Sheets

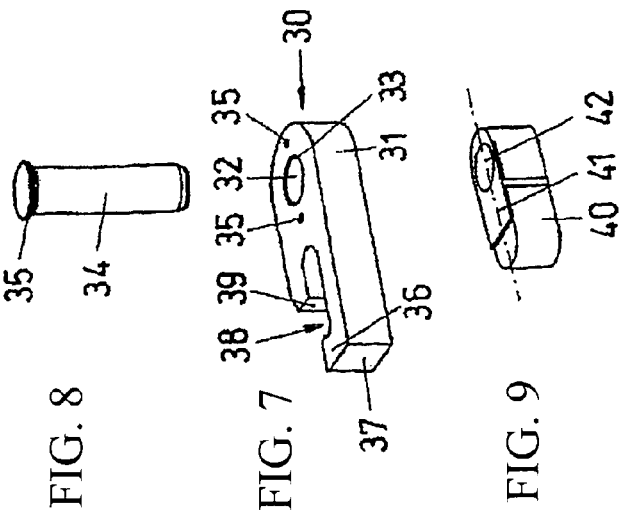
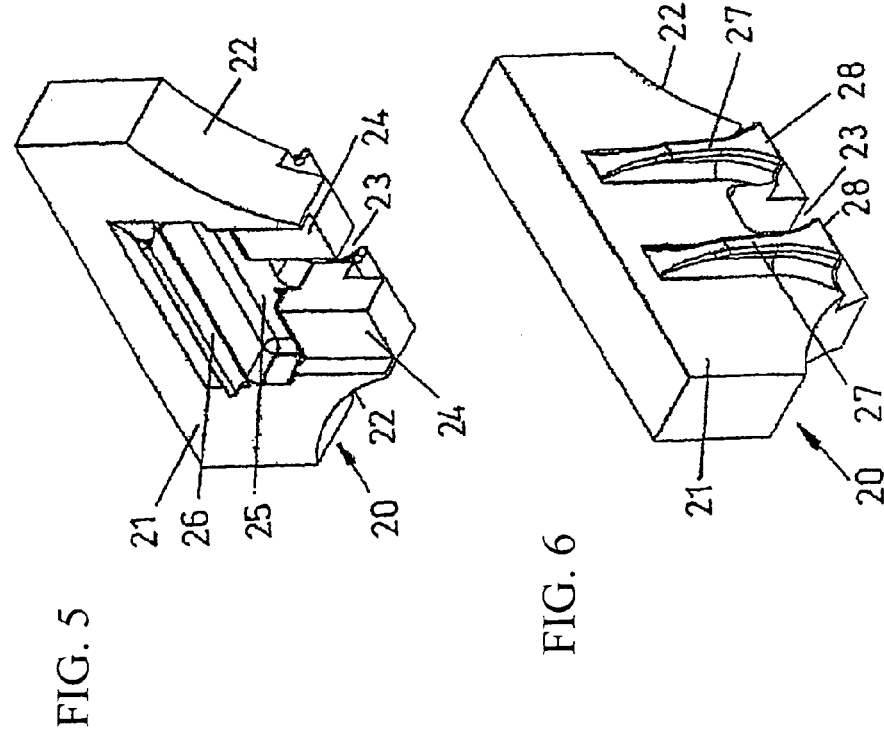

ROTOR FOR AN IMPACT CRUSHER

BACKGROUND OF THE INVENTION

1. Field of the Invention

This invention relates to a rotor for an impact crusher with a vertically extending rotor shaft and at least one stellate plate connected thereon and locked against rotation, on which a plurality of replaceable attached hammer tools are mountably attached in a relative distance to a center of the rotor disc by different replaceable adapter pieces.

2. Discussion of Related Art

Impact crushers are used in a variety of different technical fields, whereby only the use regarding the separation and delamination, respectively, of compound materials is of interest. Such compound materials can be compounds of metal/metal, plastic/plastic, metal/plastic or mineral compounds with metals and/or plastics. Because the physical properties of the individual components of the compounds are different, such compound particles are separated in impact crushers and with each impulse different materials deform unequally elastically and unequally plastically and thereby separate. Typical compound materials which are processed by the applicant are, for example, electronic waste and shredder waste, such as residue from the shredder (RESH), shredder light fractions (SLF) or automotive shredder residues (ASR) from car recycling.

The use of impact crushers in this area is associated with enormous wear of the hammer tools. This is quite contrary to hammer mills which are used for grinding of grain products, particularly in the food processing industry. An example of such a hammer mill is described in German Patent Reference DE-10 355 119 A.

Many impact crushers work with hammer blades, which are mounted across the entire effective range of the rotor shaft and extending parallel thereto. There are two versions known, namely embodiments in which the hammer blade is designed as a reversible hammer blade and thus can be reversed by 180° after a wearout of the one side and is usable again so that another tool life is available. Because such reversible hammer blades are not adjustable in radial direction they are implementable only in areas in which the abrasion per time unit is relatively small. With the abrasion, the blade not only becomes thinner but also the radial distance of the hammer blades decreases. This is not attributed to the areas of the hammer blade being located further to the outside which are moved with higher speed and thus also the respective impulses are higher and hence the abrasion is higher. If the hammer blade wears out at the outer edge, the gap between the hammer blade and the crusher walls increases and the efficiency of the mill is automatically reduced. An example of an impact crusher rotor with a reversible hammer blade is described, for example, in European Patent Reference EP-0 945 181 A. For the use in the field of compound material delamination, particularly for shredder waste from scrapped car disposal and electronic waste, constructions of the known type are hardly suitable. Besides the extremely high wear in these areas, additionally an extreme deposit of particles with partly oily portions occurs, whereby particles are deposited everywhere on the rotor. When the hammer blades have to be replaced or reversed, the respective screw connections, which serve for clamping the blades, have to be loosened. This is basically impossible without intensive cleaning.

In a very unconventional construction, in which the rotor shaft is of a casing formed of rings connected through circumferential weld seams, hammer tools, which are retained by axially parallel rods penetrating the discs can be inserted between the individual ring segments. Also, along with the wear of the tools the space between the ends of the hammer tools and the crusher wall of the stator also increases constantly and hence the efficiency of the mill is decreased.

An impact crusher with a rotor is known from PCT Patent Reference WO 00/53324-A. The rotor of this impact crusher includes a stellate plate having horseshoe-shaped hammer tools, the free ends of which are at least approximately facing radially outwards. Within the inner free space of these horseshoe-shaped hammer tools adapter pieces are mounted, which can be replaced depending on the wear of the hammer tools, so as to bring the free ends closer again to the crusher walls of the stator. Thus, the distance between these free wearing ends of the horseshoe-shaped hammer tools can be adjusted within a relatively tight range regarding the distance of these free ends and the crusher wall at the stator and thus the efficiency of the system can be maintained. The adaptors are not subject to abrasion and are replaced depending on the requirements. The impact crushers of interest herein have a rotor diameter of, for example, 1 to 2 meters and rotate with a speed of between 1000 to 3000 rpm. This results in circumferential speeds of up to 500 km/h. In case of larger elements getting into such an impact crusher or if certain lumps are building up by coincident, the torque during a drum blockade would be so high, that the rotor as well as the stator would be damaged. Because the adaptors are mounted on the stellate plate by a bolt or a screw, the adaptors can rotate but the occurring torque impulse is enormously high. The arrangement with a one-sided support of the adaptor above the stellate plate results in a disadvantageous force transmission and accordingly subsequent damages through a shearing bolt or screw, with which an adaptor is mounted on the stellate plate, can occur.

Another problem of this known rotor for an impact crusher is that the material portion of the hammer tools, which is not available for abrasion, is very high. Optimally calculated only 20 to 30% of the volume of the hammer tools are available for abrasion. This however increases the overall production cost.

SUMMARY OF THE INVENTION

It is one object of this invention to provide a rotor for an impact crusher for which the hammer tools are designed as replaceable without screw connections, for which the percentage of the wearable volume of the hammer tools is considerably increased and the support of the hammer tools is able to receive high transmission forces and the pivotability of the hammer tools relative to the stellate plate is improved and designed more secure. This object is achieved by a rotor for an impact crusher of a type having features described in this specification and in the claims.

Further advantageous embodiments of this invention arise from the claims and the relevance and mode of operation of the same are illustrated in the following description with reference to the attached drawings.

BRIEF DESCRIPTION OF THE DRAWINGS

In the drawings a preferred exemplary embodiment of this invention is illustrated in detail and described, wherein:

FIG. 5 shows the inventive hammer tool in a perspective view from inside;

FIG. 6 shows the same hammer tool, also in a perspective illustration viewed from the other side;

FIG. 7 shows a perspective illustration of a tool mounting bracket;

FIG. 8 shows a retaining bolt insertable through the tool mounting bracket;

FIG. 9 shows an adapter piece placeable in the stellate plate and replacably retained therein, the interaction of which is apparent from the following Figures;

DETAILED DESCRIPTION OF THE INVENTION

Figure 1:
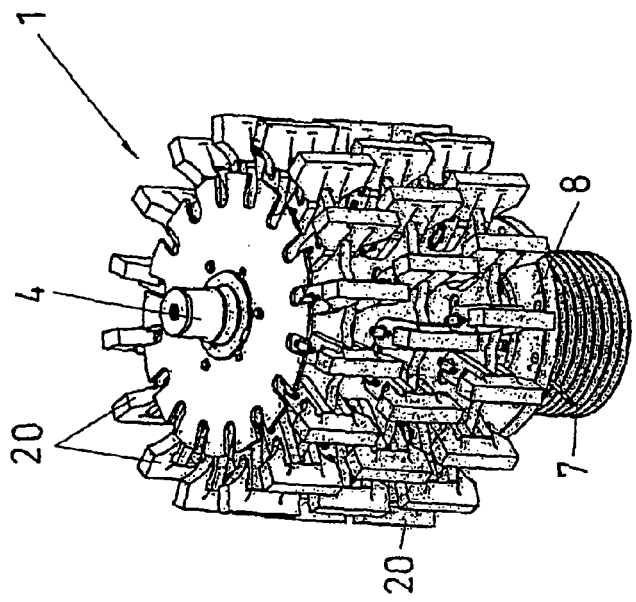
FIG. 1 shows a perspective view of a rotor of an impact crusher, according to this invention.
Figure 2:
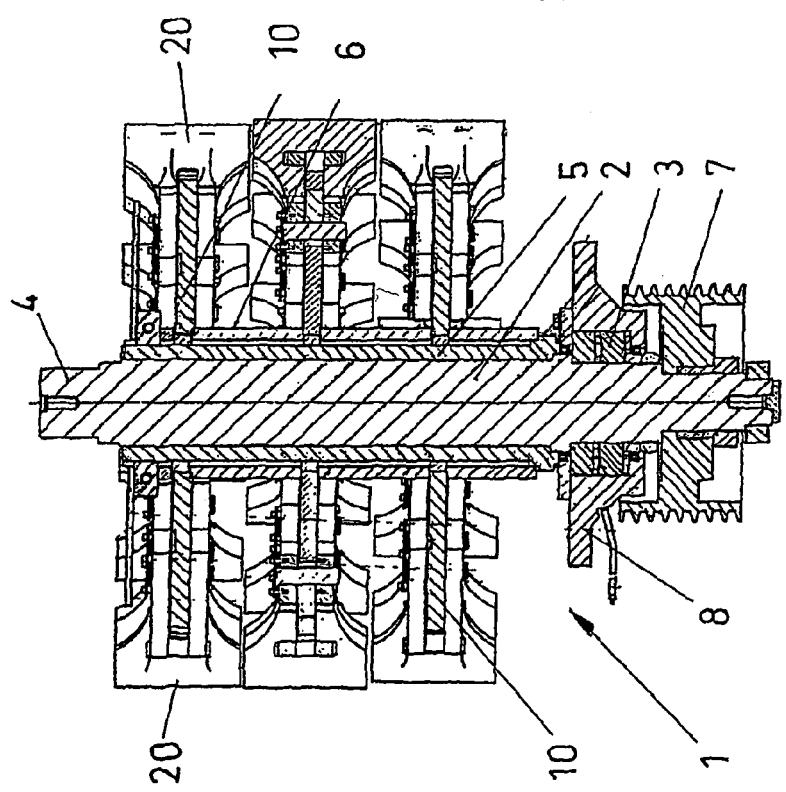
FIG. 2 shows the same rotor as in FIG. 1 but in an axial longitudinal cross section.

While the impact crusher as a whole is not illustrated herein and in principle could be designed conventionally, the rotor is shown in the FIGS. 1 and 2 in the assembly. The rotor is generally denoted with element reference numeral 1 and comprises the characteristic vertically arranged rotor shaft 2 including a bearing 3 on the drive side and a corresponding bearing 4, which is supported at the opposite end of the shaft in the housing of the mill stator. Around the shaft a shaft casing 5 is mounted on the shaft 2 locked against rotation. The shaft casing 5 comprises respective ribs for mounting of one or more stellate plates 10 in a predetermined and desired angular arrangement relative to the shaft and to each other. Between each of the individual stellate plates 10 cylindrical spacers 6 are placed, which secure the positioning of the stellate plates 10 in axial direction relative to the bearing and on the other hand relative to each other in an axial direction. The driving of the shaft takes place through a multi-grooved V-belt pulley 7, which is mounted locked against rotation at the driving end of the shaft 2. The entire rotor shaft is finally connected with the stator housing through a rotor bearing ring and is mounted on a chassis, on which a respective drive motor is arranged, by which the rotor shaft 1 can be driven via respective V-belts. The chassis plate itself can also be part of the stator housing and accordingly the rotor bearing ring 8 is then mounted directly within the chassis support plate. As mentioned, the structure and the design of the stator are not relevant here and thus are not addressed further.

Figure 3:
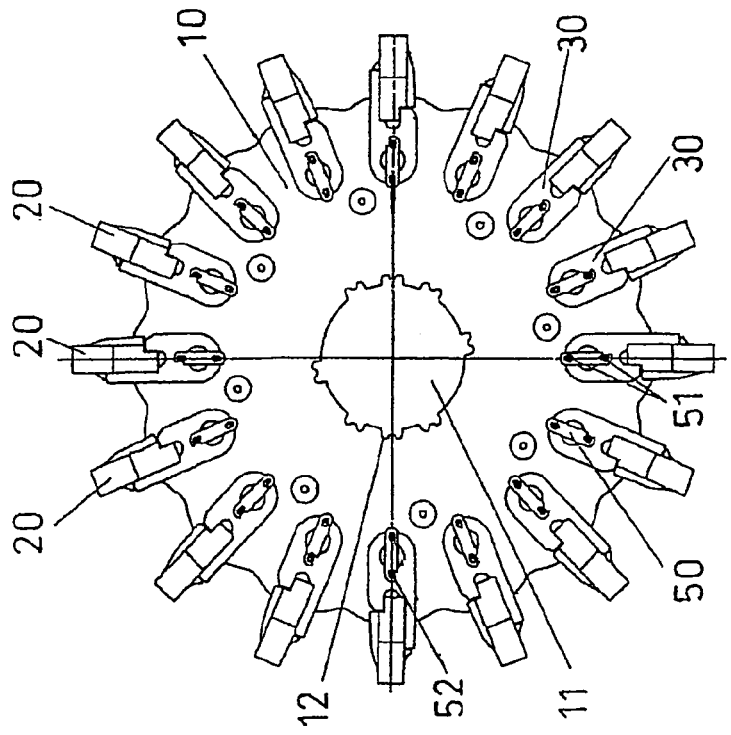
FIG. 3 shows a single stellate plate with hammer tools mounted thereon, in a plan view.

In FIG. 3, the stellate plate 10 including all hammer tools 20 mounted thereon is shown. The stellate plate 10 is so named because all tools around the periphery of the stellate plate are connected radially extending outwards and therefore forms the shape of a multi-pointed star. The stellate plate 10 comprises a centrical, circular location hole 11, in which respective rib recesses 12 in specified angle positions are formed, which are radially facing outwards. These rib recesses receive respective ribs in a positive fit on the shaft casing, thereby securing the specific angle position of the stellate plate 10 relative to the shaft. The next stellate plate 10 can be mounted accordingly in a manner that the disc engages the other ribs on the shaft casing and thereby the stellate plate is displaced by an angle relative to the before-mounted stellate plate. This angle corresponds approximately to half of the spacing of two adjacent hammer tools. A minor deviation from this spacing ensures the full pivotability of the hammer tools on adjacent stellate plates. However, with an appropriate choice of the distances between two stellate plates, the hammer tools can well be arranged in line on top of each other.

Figure 4:
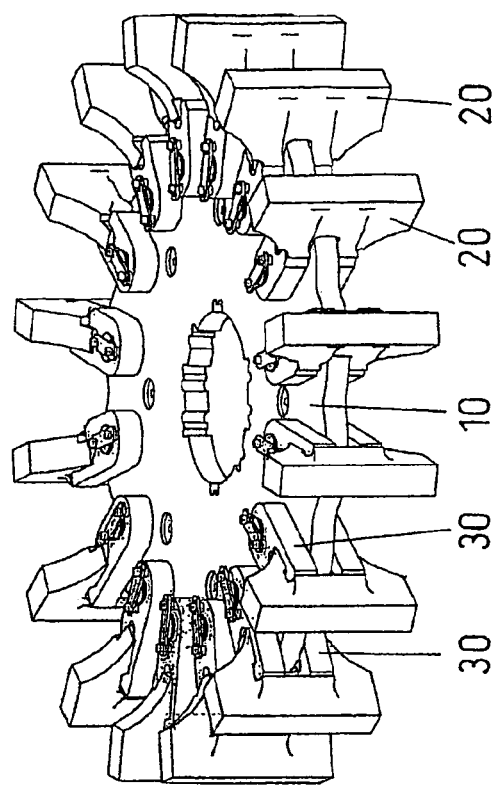
FIG. 4 shows the same stellate plate with hammer tools, but in a perspective view.

The hammer tools 20 are held in place below and above the respective stellate plate 10 by the tool mounting brackets 30. In the perspective illustration of FIG. 4 both tool mounting brackets, which are connected to the hammer tool 20 in a positive fit, are shown.

In FIGS. 5 and 6, the inventive hammer tool is shown in a perspective view from both sides. FIG. 5 shows the hammer tool with regard to the rotating direction from the rear side, thus the side which is not exposed to direct abrasion, while FIG. 6 shows the wearing side located in front with respect to the rotational direction. The hammer tools generally have the shape of a paddle blade. The front rectangular blade portion 21 is available completely for wear. At the end, which is tapered through the two side curves 22, which is facing the stellate plate, a recess 23 is shown. Left hand and right hand from this recess two holding blocks 24 are formed. These holding blocks are projecting virtually freely in direction to the stellate plate and thus can be encompassed by the tool mounting brackets, yet to be described, from four sides. An engagement groove 25 following the holding blocks 24 in direction to the blade portion 21 is shown. This engagement groove 25 is raised on the longitudinal side, which is located opposite to the holding blocks 24, and forms a support rib 26. Also, on the blade portion 21 on the side of the wear side, left hand and right hand from recess 23 reinforcing ribs 27 are formed, which rise from outside to the inside and are cut straight on their ends facing the stellate plates and form respective front faces 28.

The hammer tools 20 are connected with the stellate plate 10 through a strictly positive-fit connection. For this purpose the tool mounting brackets 30 are used. FIG. 7 shows such a tool mounting bracket in a perspective illustration. The tool mounting bracket 30 is preferably forged from high-strength steel. The hammer tools 20 are preferably made as steel castings but could also be made as forgings. The tool mounting bracket 30 has two side faces extending parallel to each other, a rounded end facing the stellate plate and a hook-shaped end facing the hammer tool. In the rounded end 31 a bearing bore 32 is formed. The bearing bore 32 comprises on its upper side of the assembly position a chamfer 33, which on one hand facilitates the insertion of the retaining bolt 34, shown in FIG. 8, and on the other hand serves as locating face for the swelling 35 on the end side of retaining bolt 34. Thus the restraining bolt has a respective stopper and stays in this position under influence of the gravity. Diametrically opposed across the bearing bore 32 there are two blind holes 35, in which two pins, not shown, can be inserted. At one of these pins a locking plate is pivotably attached, which has a recess, in order to engage in a positive and/or non-positive fit in the second pin.

The hook-shaped end 36 of the tool mounting bracket 30 comprises a straight front face 37, which in the mounted condition rests against the outer wall of the engagement groove 25 and rests against the surface of the support rib 26 aligned to the wall in the mounted condition. In the hook-shaped end 36, the respective hook-shaped recess 38 is formed. This hook-shaped recess 38 is dimensioned so that in the mounted condition the respective holding block 24 is encompassed abutting on each of the four sides. Parallel to the straight front face 37 there is a second front face 39, which in the mounted condition comes to rest against the respective front faces 28 of the reinforcing ribs 27. Thus the torque, which acts during operation of the hammer tools on the same, is supported at the two front faces 37 and 39. With the existing high speed however, the centrifugal force is so high, that this torque is completely absorbed by the centrifugal force, if not, as already described, an event occurs, which virtually abruptly results in an increase of the torque, thereby subsequently rotating the hammer tool around the bolt 34. Thus the working gap increases between the hammer tools and the circumferential crusher walls, which results in an immediate load relieving of the entire system. In FIG. 9, the adapter piece, previously not shown in the different Figures, is illustrated separately. This adapter piece typically has an elongated shape and on its longitudinal axis 42 a bearing bore 42 is positioned between the two end positions. Depending on the composition of the compound to be delaminated, the blade portion 21 on the hammer tool 20 is sooner or later worn out in a manner that the working gap between the front edge of the hammer tool and the crusher wall on the stator is so big, that either the delamination is insufficient or the efficiency is decreased. As soon as this is the case, the hammer tools have to be moved in an outward direction which can occur by replacing the adapter pieces 40. Accordingly for each rotor of an impact crusher a plurality of series of adapter pieces 40 is required, whereby for each series the relative arrangement of the bearing bore 42 on the longitudinal axis 41 is different. For illustration of the mounting, reference is made to the FIGS. 10 to 12.

Figure 10:
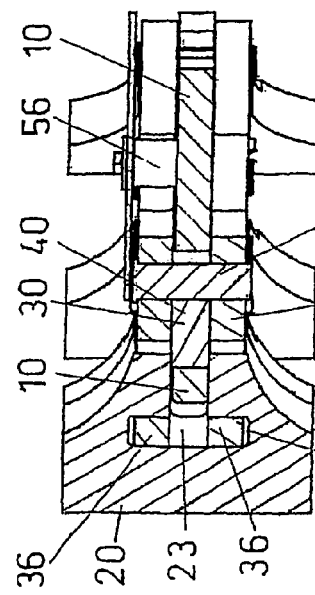
FIG. 10 shows a radial partial cross section taken through the stellate plate and the hammer tool as well as the elements required for mounting the hammer tool to the stellate plate.

In FIG. 10 a radial vertical cross section is shown. The paddle-blade-shaped hammer tool 20 is cut correspondingly in the center. The stellate plate 10 extends in the middle. The adapter piece 40 is placed in the stellate plate 10. The recess 23 in the hammer tool 20 is shown as well as the engagement groove 25 extending perpendicular thereto. The hook-shaped ends 36 of the upper and lower tool mounting bracket 30 engage in the engagement groove 25. The retaining bolt 34 penetrates from top to bottom first the upper tool mounting bracket 30 then the adapter piece 40 and finally the lower tool mounting bracket 30. The formed flange of the retaining bolt 34, which determines the position, is shown.

Figure 11:
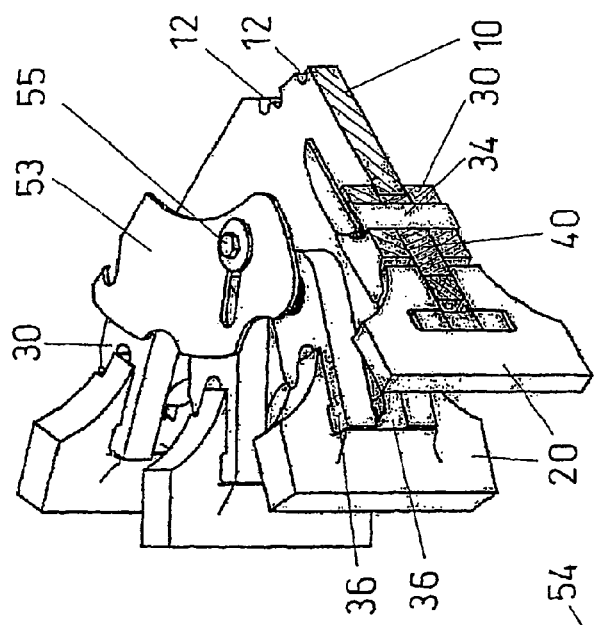
FIG. 11 shows the same cross section but in a perspective view.

In the view according to FIG. 11, which shows the same cross section in a perspective view, the rib recesses 12 in the stellate plate 10 is also shown. Referring to FIG. 3, reference is made again to the locking of the retaining bolt 34. As mentioned, blind holes, in which the pins 51 are inserted, are formed in the tool mounting brackets 30. Around the pin located inwards in a radial direction a locking plate 50 is arranged pivotably. With a lateral opening 52 the locking plate 50 encompasses the pin 51 located outwards in the radial direction. The rotational direction of the stellate plate and the rotational direction of the locking plate to lock it are opposed, whereby the locking plate virtually automatically moves into the lock position due to a combination of the moment of inertia and the centrifugal force but cannot be solely relied thereon.

Figure 12:
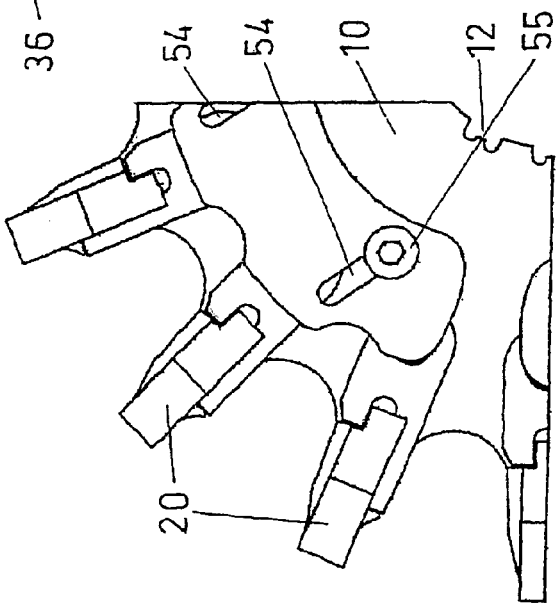
FIG. 12 shows a respective portion of the stellate plate in a plan view.

In the illustration according to the FIGS. 10 to 12, the locking of the retaining bolt 34 occurs by a security slide. This security slide has a circle-segment-shaped design and comprises two slide slots 54, which are parallel to each other and extend from inside to outwards. Locking screws 55 are projecting through the security slots 54 and an intermediate bushing 56, which is slightly longer than the thickness of the tool mounting bracket 30, into the stellate plate 10. One advantage of these security slides 53 is that, for example, for the entire periphery four of such slides are sufficient and each slide secures four retaining bolts 34 at the same time. With the higher mass of the security slide 43 it is ensured that due to the acting centrifugal forces the security slide 53 slides outwards and covers the retaining bolts completely.

The described inventive rotor for an impact crusher achieves the given object. The paddle-blade-shaped hammer tools can be used up to at least 50% remaining volume while maintaining full efficiency.

The specific design of the mounting of the hammer tools allows a screw-less replacement of the hammer tools and a screw-less adjustment of the hammer tools in a radial direction, respectively. For this purpose, it is only necessary to move the security slide 53 inwards in radial direction, to remove the now exposed retaining bolts 34, to remove the upper one of the two tool mounting brackets 30 and to pull out the respective adapter piece 40 from the stellate plate 10 and to replace it by another adapter piece with a bearing bore, whereby this bearing bore 42 is arranged on the longitudinal axis 41 of the adapter piece somewhat closer to the center. These replacement operations can be carried out without problems, without the need of carrying out a cleaning in advance. The entire impact crusher is designed so that after removal of the housing cover the rotor can be pulled out of the stator housing as a package. The required maintenance work, such as cleaning or replacement of the adapter pieces 40 can now be carried out without disassembly of the rotor.

The invention claimed is:

1. A rotor for an impact crusher, comprising:
    a vertically extending rotor shaft;
    at least one stellate plate connected on the rotor shaft and locked against rotation;
    a plurality of replaceable hammer tools mountably attached to the stellate plate, the hammer tools shaped as paddle blades and including a centrical recess on a mounting side and two holding blocks, wherein one of the two holding blocks is formed on each side of the recess;
    an adapter piece at least partially disposed within the recess and between the holding blocks of each of the hammer tools;
    a pair of tool mounting brackets for each of the hammer tools, one of the pair of tool mounting brackets above one side of the stellate plate and an other of the pair of tool mounting brackets below an opposing side of the stellate plate, each of the pair of tool mounting brackets interacting one of the holding blocks in a positive fit; and
    a retaining bolt extending through a bore in each of the pair of tool mounting brackets and the adapter piece, wherein the pair of tool mounting brackets are jointly pivotably supported through the retaining bolt to the adapter piece that is stationary fitted in the stellate plate.

2. The rotor according to claim 1, wherein the tool mounting brackets (30) are thinner by a clearance than a width of the recess (23) in the hammer tools (20).

3. The rotor according to claim 1, wherein the hammer tools (20) with the tool mounting brackets (30) are pivotable around the secured retaining bolt (34).

4. The rotor according to claim 1, wherein the holding blocks (24) on the hammer tools (20) project at the end, which is facing the stellate plate (10) in the mounted condition, and the tool mounting brackets (30) comprise hook-shaped recesses (38), which are able to encompass the respective holding block (24) in a positive fit with a clearance.

5. The rotor according to claim 4, wherein the paddle-shaped hammer tools (20) comprise an engagement groove (25) extending crosswise to the longitudinal dimension of the holding blocks, the groove wall thereof, which is remote to the holding blocks (24), is raised relative to the paddle blade face of the hammer tools (20) and forms a support rib (26) for the tool mounting brackets (30).

6. The rotor according to claim 5, wherein the paddle-blade-shaped hammer tools (20) comprise on the surface opposite to the support rib (26) two reinforcement ribs (27), extending in a recess direction and ending approximately in a center of the holding blocks (24) each comprising a front face (28) acting as a support face for respectively one tool mounting bracket (30).

7. The rotor according to claim 1, wherein in the stellate plate (10) recesses are formed, in which the adapter pieces (40), which comprise a bearing bore appropriately dimensioned for the retaining bolts (34), are positionable in a positive fit.

8. The rotor according to claim 7, wherein the adapter pieces (40) have a mirror-symmetrical outer contour and the bearing bore (32) is arranged on a longitudinal axis (41) of the adapter pieces (40).

9. The rotor according to claim 1, wherein the tool mounting brackets (30) comprise a bearing bore (32) to be penetrated by the retaining bolt (34), and two pins (51) are arranged on a straight line diametrically crossing the bearing bore (32), wherein on one of the two pins (51) a locking plate (50) is pivotably attached, which comprises a recess to engage in a positive fit and/or a non-positive fit in the second pin (51).

10. The rotor according to claim 1, wherein the rotor (1) comprises a plurality of stellate plates (10) with respective hammer tools (20) regularly distributed at a periphery, wherein respectively two adjacent stellate plates (10) are displaced by a half of a spacing of the hammer tools (20).

11. The rotor according to claim 1, wherein the rotor comprises a plurality of stellate plates (10) with hammer tools (20) arranged respectively distributed at the periphery, wherein the stellate plates are arranged in the projection congruently on top of each other, so that all hammer tools arranged on top of each other are in line.

12. The rotor according to claim 1, wherein a plurality of adjacent retaining bolts (34) are secured by a security slide (53), which comprises at least one slide slot penetrated by a locking screw, wherein the slide slot extends so that upon an effect of the centrifugal force a security slide comes to rest over the retaining bolts.

13. The rotor according to claim 1, wherein the adapter piece is replaceable with an adapter piece having a different size to extend the hammer tool in an outward direction from the rotor shaft.

14. A hammer tool for a rotor of an impact crusher with a vertically extending rotor shaft and at least one stellate plate connected thereon, locked against rotation, and on which a plurality of replaceable attached hammer tools are mountably attached in a relative distance to a center of a rotor disc, the hammer tool comprising:
a paddle blade comprising a portion tapered on each side toward an end on a mounting side of the paddle blade;
a central recess extending in the paddle blade from the end;
holding blocks, wherein one of the holding blocks is formed on each of opposing sides of the recess;
tool mounting brackets, each of the tool mounting brackets for connecting to one of the holding blocks; and
adapter pieces, a first of the adapter pieces having a different size from another of the adapter pieces, wherein the adapter pieces are interchangeable within the recess.

15. The hammer tool according to claim 14, further comprising a retaining bolt extending through the tool mounting brackets, wherein the tool mounting brackets are pivotable around the secured retaining bolt.

16. The hammer tool according to claim 15, wherein the stellate plate includes a recess in which each of the adapter pieces is positionable in a positive fit, and wherein each of the adapter pieces comprises a bearing bore for receiving the retaining bolt therethrough.

17. The hammer tool according to claim 14, further comprising:
an engagement groove at an end of the holding blocks that is opposite the end of the paddle blade on the mounting side; and
the tool mounting brackets each comprising a hook-shaped end for fitting around a corresponding holding block and within the engagement groove.

18. The hammer tool according to claim 17, wherein the engagement groove extends crosswise to the longitudinal dimension of the holding blocks, and a groove wall thereof which is remote to the holding blocks is raised relative to the paddle blade face of the hammer tool and forms a support rib for the tool mounting brackets.

19. The hammer tool according to claim 14, wherein each of the tool mounting brackets comprises a hook-shaped end extending partially around a hook-shaped recess, wherein the hook-shaped end extends around a corresponding holding block that is disposed within the hook-shaped recess.

20. The hammer tool according to claim 14, wherein each of the tool mounting brackets comprise two pins disposed on opposite sides of a bearing bore, wherein on one of the two pins a locking plate is pivotably attached in a positive fit and on an other of the two pins the locking plate engages by a recess in the locking plate.

* * * * *